3,041,297
PLASTIC COMPOSITIONS PREPARED FROM ALKYD RESINS AND RUBBER LATICES AND METHOD OF PREPARING AND USING SAME
Charles Di Battista, 716 Willow St., Cranford, N.J.
No Drawing. Filed Jan. 16, 1959, Ser. No. 787,129
5 Claims. (Cl. 260—5)

The present invention relates to novel and useful plastic compositions having extraordinary adhesive and cohesive properties and which retain their plastic nature and high cohesive and adhesive characteristics over prolonged periods under a wide range of climatic conditions.

These compositions are of particular utility for the filling of expansion joints between concrete slabs in road building and as a surface coating for waterproofing roads and the like.

For instance, they may be poured at normal temperature into the horizontal crack between sections of concrete of highways and will set to a plastic consistency upon standing and will bond to the concrete even without the use of a priming coat. Or they may be used as a plastic composition in calking guns or by troweling into vertically-extending cracks, likewise without the necessity of using a priming coat, and will bond thereto and set in position without sagging and without exterior supporting means.

These compositions of my invention are produced by mixing a rubber latex, or a mixture of rubber latices, with an alkyd resin of the type hereinafter described and stirring the materials together, advantageously, at ambient temperature for a period of about ½ minute. More advantageously, these materials are mixed at the point of use and only shortly prior to their use, the time period between mixing and use depending primarily upon the desired working consistency.

Where the mixture is to be poured into horizontal cracks or the like, it should generally be used within 10 to 15 minutes after mixing. Upon longer standing, the mixture develops a plastic consistency (such as inhibits ready pouring but permits its use in calking guns or by troweling, for instance, for filling vertically-extending cracks or for waterproofing porous surfaces.

The mixture, after setting, retains its pliable nature, with retained adhesive and cohesive characteristics, under temperatures extending well below 0° Fahrenheit and even under such low temperature conditions retains a surprising degree of elasticity.

When used in road building, as a filler between concrete sections, automobiles and trucks may be passed over the road in 24 hours after application or in even a shorter time period where sand or the like is sprinkled over the joint to prevent adhesion to the vehicle tires.

Upon contraction of the concrete sections following a period of expansion, the composition is drawn back into the crack leaving no ridges, such as experienced with conventional joint fillers. Further, the composition is highly resistant to organic solvents, such as motor oil, gasoline and the like, and is unaffected by rock salt and other chemicals used in snow removal.

The alkyd resin constituent, used in accordance with my present invention, will be defined herein as a medium oil, oxidizing, phthalic-pentaerythritol alkyd resin modified by the incorporation therein of about an equal proportion of a drying oil acid. More particularly these resins are the reaction product of phthalic anhydride and pentaerythritol modified by the inclusion therein of an oil acid of the linseed or soybean type in proportions approximately equal to the combined weights of the phthalic anhydride and pentaerythritol, say about 45–50% of the total weight of the modified resin.

Resins of this type which have been used with particular advantage are those, in the production of which, the above-named constituents are used in proportions within the following ranges, by weight:

| | Percent |
|---|---|
| Phthalic anhydride | 34–38 |
| Pentaerythritol (maximum) | 18–19 |
| Drying oil acid | 46–51 |

The alkyd resins described above are known and readily available items of commerce, usually as 50% mineral spirits solutions. They have heretofore been proposed for use in air-drying automobile finishes, fast baking enamels and the like, but to my knowledge have not heretofore been used in accordance with the present invention.

One such resin solution of the type described above, which I have found especially adapted for use in accordance with this invention, is that marketed by American Cyanamid Company under its proprietary trade name "Rezyl Resin 811–1" having the following specifications.

Solution:
- Solids _____ 50%.
- Solvent _____ Mineral spirits.
- Color (Gardner 1933) _____ 5–9.
- Viscosity at 25° C. _____ Z–Z3.
- Pounds per gallon _____ 7.8.

Solid resin:
- Phthalic anhydride _____ 35–38%.
- Acid number _____ 4–10.
- Pentaerythritol (maximum) ____ 19%.
- Oil acids _____ 46–49%.
- Type of oil _____ Linseed.

A further resin solution of this type which I have also used with advantage is one marketed by American Cyanamid Company under its proprietary trade name "Rezyl Resin 435–1" having the following specifications.

Solution:
- Solids _____ 50%.
- Solvent _____ Mineral spirits.
- Color (Gardner 1933) _____ 5–9.
- Viscosity at 25° C. _____ $Z_2$–$Z_5$.
- Pounds per gallon _____ 7.7.

Solid resin:
- Phthalic anhydride _____ 34–37%.
- Acid number _____ 6–12.
- Pentaerythritol (maximum) ____ 18%.
- Oil acids _____ 48–51%.
- Type of oil _____ Soybean.

In the foregoing specifications, the proportion of the constituent designated "oil acids" will be understood to be based on the proportion of acidic material present in the drying oil.

As the latex constituent of my compositions, I may with advantage use either a natural rubber latex or a synthetic rubber latex, such as a latex of polymeric chloropreen or a latex of butadiene-styrene copolymers or mixtures of such latices. I have with particular advantage used a stabilized natural rubber latex herein designated latex A.

The latex herein designated latex A is essentially an aqueous suspension containing 50–55% natural rubber solids and stabilized by adding thereto, for each 100 parts of rubber solid, 2–6 parts of casein, as a protective colloid, and about ⅒ part of a conventionally used phenolic mold inhibitor, for instance, of the type marketed by Dow Chemical Company under its proprietary trade name "Dowicide-D," and consisting essentially of sodium 2-chloro-4-phenylphenate. This latex A also contained the following antioxidants, expressed in parts by weight per 100 parts of rubber:

| | Parts |
|---|---|
| Zinc oxide | 2 |
| Zinc dibutyl dithiocarbamate | 1 |
| p-(p-Tolyl-sulfonylamido) dimethylamine | ¼ |
| Di- and tristyrenated phenol | 1 |

The chloroprene polymer latex which I have used with particular advantage, herein designated latex B, also contained approximately 50–55% rubber solids and, except for the nature of the rubber, its composition was substantially identical with latex A, including the same preservatives, antioxidants and stabilizing agents in the previously indicated proportions.

The further natural rubber latex, herein designated latex C, which I have used with advantage, is the conventional ammonia-stabilized natural rubber latex of commerce, which contains about 35–40% rubber solids.

In lieu of the latices just described, or in conjunction therewith, one may use a butadiene-styrene latex preserved and stabilized as is latex A.

It will be understood that my invention is not restricted to the use of the particular resin and latex constituents just specifically described but contemplates the use of other resin and latex constituents of the same general character.

Most advantageously, I have used a mixture of the three types of latices just described for the reasons hereinafter stated. I also prefer to incorporate in the mixture a minor proportion of glycerine, but the invention in its broader aspect is not so restricted.

I may also incorporate in my composition various fillers of an inert nature such as talc, calcium carbonate, carbon black, iron oxide, fuller's earth or the like, or in lieu of such filler, or in conjunction therewith, I may incorporate finely ground rubber in the mixture. In lieu of the material just mentioned, or in conjunction therewith, I may also add Portland cement or "Lumnite" cement, the latter being a calcium-aluminate cement of commerce.

As previously noted, the setting of the composition is initiated upon mixing the resin constituent with the latex constituent. Therefore, these materials should be kept separate until just prior to use. Where an inert filler is used, it may be premixed either with the resin constituent or with the latex constituent or it may be premixed in part with the latex constituent and in part with the resin constituent. Where Portland cement, or other material which tends to harden under absorption of water is used, the premixing of such material with a latex constituent should be avoided. Under such conditions, the Portland cement or the like is, with advantage, premixed with the resin constituent.

The proportion of filler added is subject to considerable variation depending upon the desired properties of the composition. I have, with particular advantage, used inert filler in proportions ranging from 5% to 25% by weight of the finished composition. Where a filler such as Portland cement or "Lumnite" cement is used, most advantageous results have been obtained where the proportion of the cement is within the range of 5 parts to 20 parts per 100 parts of the resin constituent.

The proportion of latex constituent to resin constituent may likewise be varied somewhat but usually should approximate equal proportions by volume.

As previously noted, the latex constituent may consist of a single latex or a mixture of latices. I have found, however, that the characteristic of my composition may, with advantage, be varied when desired by using a mixture of the respective latices and varying the proportion thereof to obtain the desired results. I may thereby vary the setting time and the adhesive and cohesive characteristics of the product to meet various specifications.

For most purposes, and under general working conditions, I have found a mixture of latices of the following composition to be most satisfactory:

| | Parts |
|---|---|
| Latex A | 80 |
| Latex B | 20 |
| Latex C | 3 |

However, excellent results have been obtained using a mixture of these latices in proportions ranging from 50 parts to 100 parts of latex A in place of the 80 parts given in the above tabulation. Likewise, the proportions of latex B and latex C may respectively be increased to 100 parts, i.e. equal proportions of the respective latices may be used, or may be varied within the range of 50–100 parts per 80 parts of latex A.

In the latex mixture described above, I have, with advantage, used a small proportion of glycerine ranging from 1 part to 10 parts, more advantageously, about 3 parts, based on the foregoing tabulation.

As a guide in determining the optimum composition of the latex constituent, it may be pointed out that the setting of the resultant composition tends to be retarded by the latex A while either latex B or latex C tends to hasten the set. An increase in the proportion of latex B tends to increase the adhesiveness of the resultant composition and to render it more resistant to hydrocarbon solvents. An increase in latex C tends to increase the cohesiveness of the resultant composition and the glycerine tends to prolong the plastic life of the composition and to render it more pliable under low temperature conditions.

Thus by selecting one or more of the above-noted latices tending to produce the required results and adjusting the proportion thereof in accordance with the foregoing directions, compositions suitable to meet a wide variety of needs may be produced.

While separate, either with or without the addition of a filler as previously described, the resin constituent and the latex constituent, respectively, are stable over long periods of time and have been observed to have a shelf life of at least 5 months. But upon mixing, the setting of the mixture is initiated and the rate at which the setting occurs can be regulated, as previously described, by the composition of the latex constituent. Thus the pouring time, i.e. the period of time over which the composition remains readily pourable may be varied at will, say from 5 minutes to 30 minutes, or even more. However, by thus extending the pouring time, the time required for the composition to set-up to a plastic consistency is likewise extended.

Where the composition is to be used in a calking gun or for troweling, a plastic consistency is, of course, desired and this consistency is obtained merely by permitting the mixture to stand for one-half hour or longer, depending upon the selected composition of the latex constituent, until the desired consistency has been reached.

When a filler, such as previously mentioned, is premixed with the resin constituent in proportions such as to render the mixture too stiff for ready mixing with the latex constituent, more mineral spirits or the like may be added to the resin-filler mixture in amounts sufficient to render it sufficiently fluid for ready mixing.

In addition to use as a crack filler, my plastic composition has been found to be especially useful for waterproofing roads having a surface of pervious material. For this purpose, a thin layer of my composition, after it has set to a thin plastic consistency, is evenly spread in a thin layer, for instance ranging from 1/32 to 1/8 inch, over the pervious surface of the road. Advantageously, the surface of the composition is then covered by a thin layer of sand which is then pressed into the composition by light rolling. This treatment not only provides a waterproof surface for the road but it does not chip or crack due to severe temperature changes and also decreases road reflection and glare and materially lessens the skidding hazard.

By conventional tests, it has been shown that the compositions of my present invention may be distorted by 50% or more and are sufficiently elastic, even at zero degrees Fahrenheit, to return to their original configuration when the confining surfaces are again moved apart to their original positions.

The invention will be further illustrated by the following specific examples of my new compositions and the method of preparing and using the same.

80 parts of latex A, 20 parts of latex B and 3 parts of latex C and 3 parts of glycerine, each by weight, are mixed together with stirring and the resultant mixture is mixed with an equal volume of a 50% solution of the resin previously identified herein as "Rezyl Resin 811–1" by stirring for approximately ½ minute at ambient temperature. This mixture is then allowed to stand for approximately 10 minutes at which time the mixture is found to be of good pouring consistency and is readily applied as a crack filler between the concrete slabs of highways by pouring into such cracks to a depth such that the surface of the filler is flush with the highway surface. When this mixture is permitted to stand for a longer period of time before use, say in excess of about 15 minutes, its consistency increases and upon standing for approximately ½ hour is of a consistency suitable for use in calking guns or for troweling or may be applied as a waterproof surface coating to highway or other surfaces as heretofore described.

As previously noted, the glycerine may be omitted from the mixture and the proportion of resin constituent to latex constituent is subject to considerable variation without loss of the essential properties of the composition. For instance, depending upon the intended use of the resultant product, the proportion of latex constituent to resin constituent may be varied within the range of 1:3 to 3:1 without loss of the advantageous properties of my composition.

I claim:

1. A composition of matter resulting from stirring together a medium oil, oxidizing, phthalic-pentaerythritol alkyd resin, modified by the incorporation therein of about an equal proportion of a drying oil acid, in solution in mineral spirits, with rubber latex in proportion by volume within the range of 1:3 to 3:1, the latex being of the following approximate composition by weight: (A) a natural rubber latex and (B) a chloroprene polymer latex, each containing about 50–55% rubber solids and each stabilized by having incorporated therein, per 100 parts of rubber solid, about 2–6 parts of casein, as a protective colloid, about 1/10 part of phenolic mold inhibitor, and about 2 parts zinc oxide, about 1 part zinc dibutyl dithiocarbamate, about ¼ part p-(p-tolyl-sulfonylamido) dimethylamine and about 1 part di- and tristyrenated phenol, as antioxidants, and (C) ammonia-stabilized natural rubber latex containing about 35–40% rubber solids.

2. The composition of claim 1 in which there has been incorporated a minor proportion of glycerine within the range of 1–10 parts.

3. The composition of claim 1 in which the proportions of the respective latices comprising the latex mixture are approximately as follows, by weight:

| | Parts |
|---|---|
| Latex A | 50–100 |
| Latex B | 20–100 |
| Latex C | 3–100 |

4. The composition of claim 3 in which the proportions of the respective latices comprising the latex mixture are approximately as follows, by weight:

| | Parts |
|---|---|
| Latex A | 80 |
| Latex B | 20 |
| Latex C | 3 |

5. The composition of claim 3 in which the proportions of the respective latices comprising the latex mixture are approximately as follows, by weight:

| | Parts |
|---|---|
| Latex A | 80 |
| Latex B | 50–100 |
| Latex C | 50–100 |

References Cited in the file of this patent

UNITED STATES PATENTS

| 2,029,410 | Carothers et al. | Feb. 4, 1936 |
| 2,470,953 | Robertson et al. | May 24, 1949 |
| 2,837,444 | Hahn | June 3, 1958 |
| 2,888,417 | Crouch | May 26, 1959 |